United States Patent
Doerr et al.

(10) Patent No.: US 6,236,781 B1
(45) Date of Patent: May 22, 2001

(54) DUPLICATED-PORT WAVEGUIDE GRATING ROUTER HAVING SUBSTANTIALLY FLAT PASSBANDS

(75) Inventors: Christopher Richard Doerr, Middletown; Randy Clinton Giles, Whippany, both of NJ (US)

(73) Assignee: Agere Systems Optoelectronics Guardian Corp., Miami Lakes, FL (US)

( * ) Notice: Subject to any disclaimer, the term of this patent is extended or adjusted under 35 U.S.C. 154(b) by 0 days.

(21) Appl. No.: 09/409,463

(22) Filed: Sep. 30, 1999

(51) Int. Cl.⁷ ........................................ G02B 6/34
(52) U.S. Cl. .................. 385/37; 385/24; 385/46; 359/124; 359/128
(58) Field of Search .................. 385/37, 24, 39, 385/27, 46; 359/124, 128, 130

(56) References Cited

U.S. PATENT DOCUMENTS

| | | | |
|---|---|---|---|
| 5,002,350 | 3/1991 | Dragone | 350/96 |
| 5,136,671 | 8/1992 | Dragone | 385/46 |
| 5,412,744 | 5/1995 | Dragone | 385/24 |
| 5,706,377 * | 1/1998 | Li | 385/37 |
| 6,049,644 * | 4/2000 | Dragone | 385/37 |

* cited by examiner

*Primary Examiner*—Darren Schuberg
*Assistant Examiner*—Fayez Assaf
(74) *Attorney, Agent, or Firm*—Jeffrey J. Brosemer

(57) ABSTRACT

A duplicated-port waveguide grating router is provided that includes a first free space region configured to receive an optical signal from at least one input waveguide. An optical grating comprising a plurality of waveguides is connected to the first free space region. The optical grating is defined by a plurality of unequal length waveguides. Connected to the optical grating is a second free space region, A plurality of output waveguides are connected to the second free space region, wherein the plurality of output waveguides includes at least two adjacent waveguides having ends remote from the second free space region. A 2×2 coupler having two input ports connected to the remote ends of the two adjacent waveguides and two output ports, which are the output ports of the duplicated-port waveguide grating router. The duplicated-port waveguide grating router provides substantially identical specifiable passband and widths within the two output ports. The 2×2 coupler, for example an evanescent coupler, realizes a substantially 90° phase difference between optical signals propagated within the two adjacent output waveguides that are coupled to produce the two identical, substantially flat passband spectral responses.

8 Claims, 4 Drawing Sheets

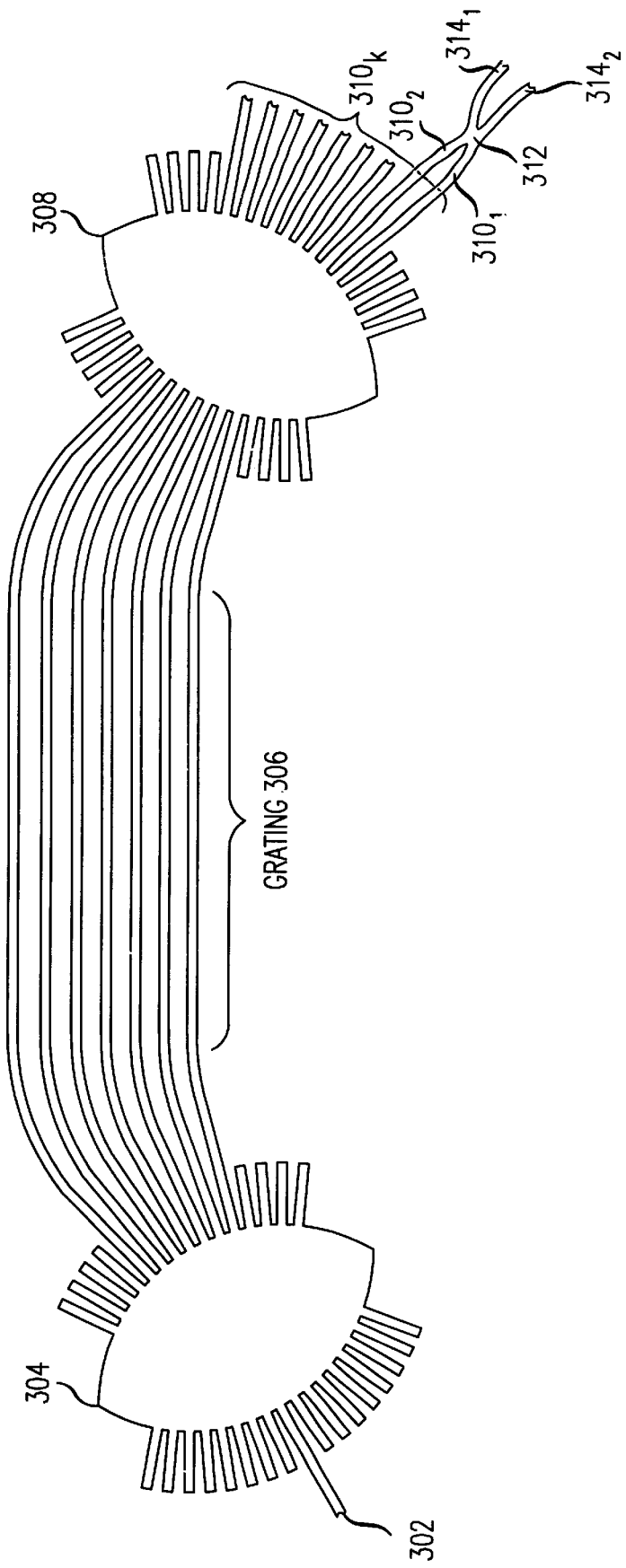

DUPLICATED-PORT WAVEGUIDE GRATING ROUTER HAVING SUBSTANTIALLY FLAT PASSBANDS

FIELD OF THE INVENTION

The invention relates generally to an optical interconnection device and, more particularly, to a waveguide grating router that has a substantially flat passband.

BACKGROUND OF THE INVENTION

Waveguide grating routers are used in conventional lightwave systems as optical switches, multiplexers, demultiplexers, detectors, add/drop filters, one by N (1×N), N by one (N×1) splitters and N by N (N×N) arrays. Typically, such waveguide grating routers include an interconnection apparatus having a plurality of closely spaced input waveguides communicating with an input of a star coupler. An output of the star coupler communicates with an optical grating comprising a series of optical waveguides. Each of the grating waveguides differs in length with respect to its nearest neighbor by a predetermined fixed amount. The optical grating is further connected to an input of a second star coupler, the outputs of which form outputs of the switching, multiplexing, and demultiplexing apparatus. Waveguide grating routers are also frequently referred to as "frequency routing devices" and are further described in U.S. Pat. No. 5,002,350, issued Mar. 26, 1991 to C. Dragone, entitled "Optical Multiplexer/Demultiplexer" (hereinafter "Dragone 1") and U.S. Pat. No. 5, 136,671, issued Aug. 4, 1992 to C. Dragone, entitled "Optical Switch, Multiplexer, and Demultiplexer" (hereinafter "Dragone 2"), both of which are hereby incorporated by reference.

Such frequency routing devices are employed as wavelength routers in optical networks to drop and add optical channels at various nodes in an optical network. A particular channel may pass through several routers without regeneration before leaving the network. For this reason, it is desirable for each frequency routing device to provide a maximally flat passband.

Known frequency routing devices do not efficiently provide a flat passband between a distinct one of the input ports and a distinct one of the output ports. U.S. Pat. No. 5,412,744, issued May 2, 1995 to C. Dragone, entitled "Frequency Routing Device Having Wide and Substantially Flat Passband" (hereinafter "Dragone 3"), and hereby incorporated by reference, discloses a frequency routing device in which a flat passband is achieved by combining a frequency routing device with a Y-branch coupler. One limitation of this device, however, is that there is an inherent loss of optical power due to the presence of the coupler.

Thus, there is a need for a waveguide grating router having a substantially flat passband, without the disadvantages of prior art systems.

SUMMARY OF THE INVENTION

In accordance with the principles of the present invention a duplicated-port waveguide grating router having a substantially flat passband is achieved while reducing optical power loss. In one illustrative embodiment, the duplicated-port waveguide grating router includes a first free space region for receiving an optical signal from at least one input waveguide. An optical grating comprising a plurality of waveguides is connected to the first free space region. The optical grating is defined by a plurality of unequal length waveguides. Connected to the optical grating is a second free space region. A plurality of output waveguides are connected to the second free space region, wherein the plurality of output waveguides includes at least two adjacent waveguides having ends remote from the second free space region. A 2×2 coupler having two input ports is connected to the remote ends of the two adjacent waveguides and two output ports, which are the output ports of the waveguide grating router. The duplicated-port waveguide grating router provides substantially identical specifiable passband widths within the two output ports.

The coupler, for example an evanescent coupler, realizes a substantially 90° phase difference between optical signals propagated within the two adjacent output waveguides that are coupled to produce the two identical, substantially flat passband spectral responses. Advantageously, there is no excess loss in the duplicated-port waveguide grating router, since portions of the input optical power are directed to each of the duplicate output ports and thus, not radiated out or lost, as in prior art waveguide grating routers.

BRIEF DESCRIPTION OF THE DRAWING

The invention will be more readily understood after reading the following detailed description taken in conjunction with the accompanying drawing, in which:

FIG. 3 depicts an illustrative embodiment of a waveguide grating router in accordance with the principles of the present invention;

DETAILED DESCRIPTION

A brief description of the prior art waveguide grating routers is provided in order to develop a better understanding of the present invention and its departure from the prior art. As noted earlier, a waveguide grating router is also known as a frequency routing device. The latter term describes the action of light at different channels or frequencies taking different paths through a waveguide grating router. In the description which follows, the terms "frequency" and "wavelength" may be used interchangeably when referring to the operation of a waveguide grating router.

Figure 1:
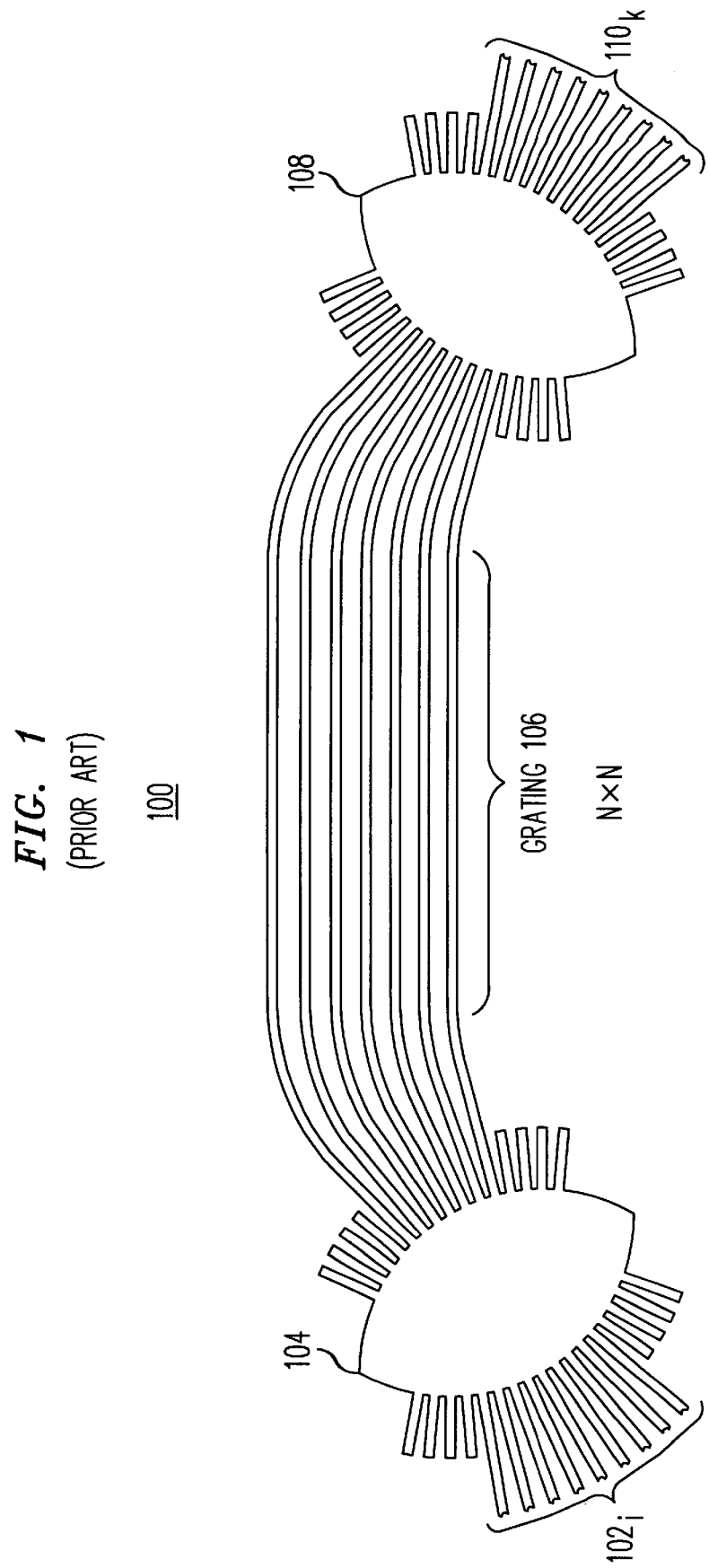
FIG. 1 depicts a prior art waveguide grating router.

FIG. 1 shows a prior art waveguide grating router 100, which includes a plurality of input waveguides $102_i$, i=1,2, ... N, a first and second free space region 104 and 108 respectively, an optical grating 106 and a plurality of output waveguides $110_k$, k=1,2, ... N. As illustrated, the plurality of input waveguides $102_i$, i=1,2, ... N is connected to free space region 104. The plurality of output waveguides $110_k$k, k=1,2, ... N extends from second free space region 108, which is coupled to optical grating 106. Optical grating 106 includes a plurality of unequal length waveguides that provide a predetermined amount of path length difference to the corresponding plurality of input waveguides $102_i$.

In operation, if a signal of amplitude A is applied to one of the input waveguides $102_i$, for example, input waveguide $102_1$, then signals of amplitudes $AT_{11}, AT_{12}, \ldots AT_{1N}$ are produced at output waveguides $110_k$ where $T_{ik}$ is the value of the transmission coefficient for input waveguide $102_1$ and the plurality of output waveguides $110_k$. The transmission coefficient $T_{ik}$ component of the signals produced at output waveguides $110_k$ is gaussian.

Figure 2:
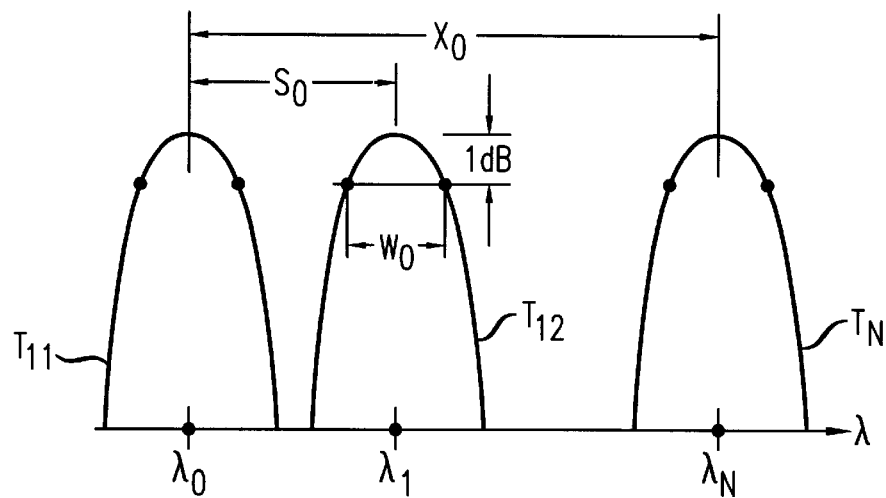
FIG. 2 is a graph of the composite output amplitude spectrum of the transmitted power from the various output waveguides of the waveguide grating router illustrated in FIG. 1 (prior art)

The typical behavior of waveguide grating router 100 is illustrated in FIG. 2. This figure shows the set of transmission coefficients $T_{ik}$ for the waveguide grating router for a particular input port $102_1$ as a function of wavelength ($\lambda$). The channel spacing $S_o$ is defined as the wavelength separation between maximum peaks of adjacent transmission coefficients. The variation of each transmission coefficient as a function of wavelength is essentially periodic with a period $X_o$, which is often referred to as the free spectral range of the router. The wavelengths $\lambda_o, \lambda_1, \ldots \lambda_k$ of maximum transmission for each of the transmission coefficients are referred to as the center wavelengths. The transmission coefficients are substantially equal to unity at the center wavelengths if certain inherent losses are ignored.

As indicated above, a wide passband was realized by combining two adjacent waveguides of a waveguide grating router with a Y-branch coupler in Dragone 3. Briefly, a Y-branch coupler is connected to two adjacent output waveguides. The two output waveguides define a gap S therebetween, which is on the order of a few microns. When the optical signals propagating within the two adjacent output waveguides are combined in the Y-branch coupler, the resulting transmission coefficient is a linear combination of the individual transmission coefficients produced by the two output waveguides. The resultant transmission coefficient is a wide passband region with two distinct maxima separated by a minimum. However, this arrangement suffers from an inherent loss of optical power due to the Y-branch coupler.

As will be understood by persons skilled in the art, each Y-branch has two so-called "states", an ON state and an OFF state. Light entering the two identical waveguide arms has a zero relative phase difference (because the arms have equal lengths). Thus, the combined field that impinges on the output waveguide branch is symmetrical—i.e., its transverse mode profile has positive (even) symmetry (parity) upon spatial inversion about the center of the output waveguide. This is known as the ON state. The OFF state is obtained by introducing a 180 ($\pi$) relative phase difference between the separate fields. Now, the combined field that impinges on the output waveguide is antisymmetrical—i.e., its transverse mode profile has negative (odd) symmetry (parity) upon spatial inversion about the center of the output waveguide. Because, by construction, the output waveguide is a single-transverse-mode waveguide and this single mode has even-parity symmetry, only the even-parity light field from the branches can be coupled into the output waveguide. The light from the odd-parity light field is radiated into the substrate.

FIG. 3 illustrates an embodiment of a waveguide grating router 300 in accordance with the principles of the present invention. Waveguide grating router 300 includes an input waveguide 302, a first free space region 304, an optical grating 306, a second free space region 308, a plurality of output waveguides $310_k$, k=1,2, . . . N and at least one 2×2 coupler 312, with output waveguides $314_1$ and $314_2$ (hereinafter known as output ports $314_1$ and $314_2$). The coupler may be, for example, an evanescent coupler, multimode interference coupler, star coupler or the like, in which the coupler has two input ports and two output ports. 2×2 coupler 312 is connected to the remote ends of two adjacent output waveguides $310_k$ (e.g., output waveguide $310_1$ and $310_2$), wherein the coupled output waveguides are located a predetermined distance apart to produce a given passband width.

As is now well known in the art, to provide a waveguide grating router with a relatively wide transmission function, the channel spacing S between the coupled adjacent waveguides should be reduced so as to cause the corresponding transmission coefficients to overlap. Accordingly, by properly selecting the spacing between the coupled waveguides, the resulting coefficient exhibits the desired wide passband.

Unlike the prior art, however, the respective coupled output waveguides are coupled together using a 2×2 coupler that has two closely separated identical waveguides, the two waveguides are identical and parallel in the coupling region and they bend away (and decouple) from each other gradually at both ends. As will be understood by persons skilled in the art, the evanescent tail of the lightwave in one waveguide extends to the neighboring waveguide and induces an electric polarization. The polarization generates a lightwave in the second waveguide, which also couples back to the first waveguide. In addition, the two waveguides support symmetrical and asymmetrical guided fields.

Figure 4A:
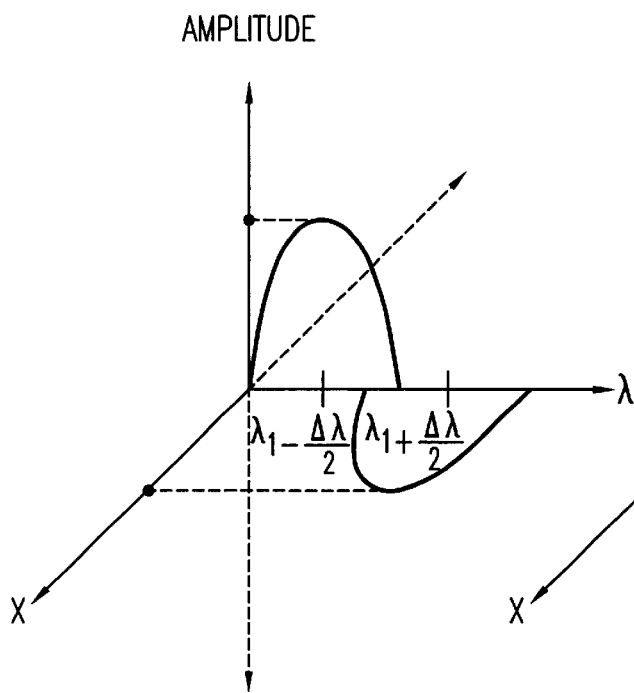
FIGS. 4a and 4b are graphs of the amplitude spectrum of the transmitted power of the optical signals propagating the 2×2 coupler portion of the waveguide grating router illustrated in FIG. 3.
Figure 4B:
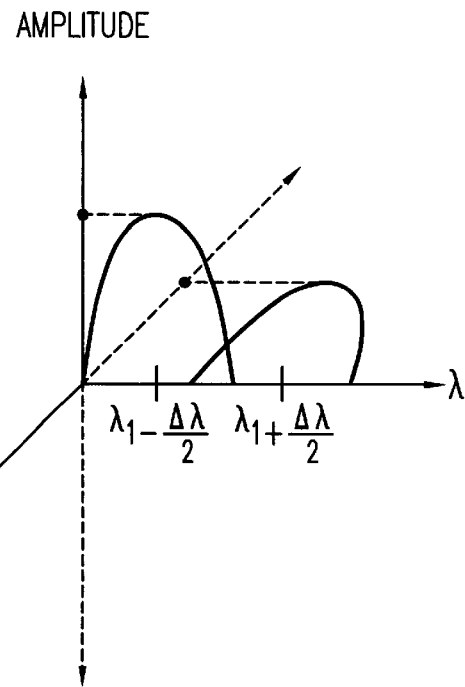

Importantly, a phase difference of substantially 90° ($\pi/2$) is generated in the 2×2 coupler due to (1) the fields (optical signals) propagating at different velocities in the coupling region and (2) the bend regions at the input and output of the 2×2 coupler. The amplitude spectrum of the transmitted power illustrating the 90° phase difference of the optical signals propagating in a portion of the respective waveguides of the 2×2 coupler's waveguides is shown in FIGS. 4a and 4b.

Figure 5:
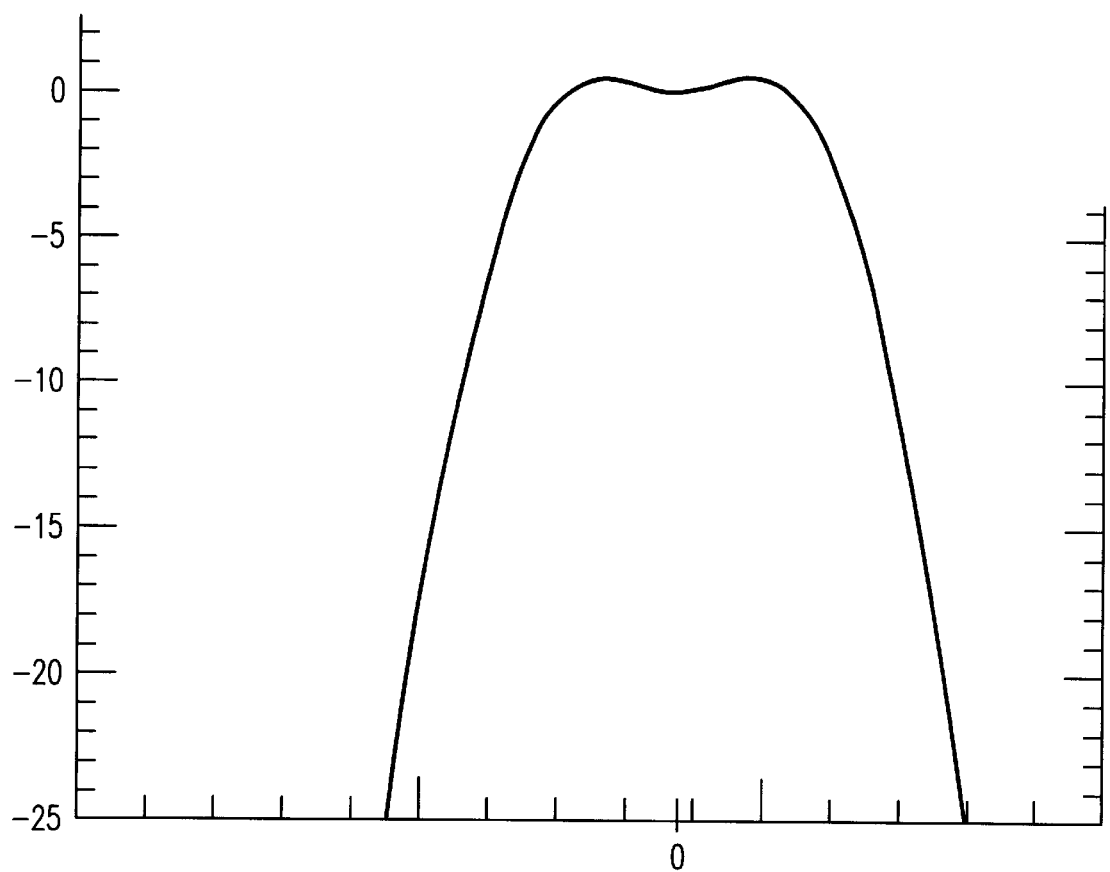
FIG. 5 is a graph of the resultant transmission coefficient of one of the output ports of the waveguide grating router illustrated in FIG. 3.

When two adjacent output waveguides ($310_1$ and $310_2$) in FIG. 3 are combined in 2×2 coupler 312, the resulting transmission coefficients in each of the 2×2 coupler output ports $314_1$ and $314_2$, are a linear combination of the individual transmission coefficients produced by the waveguides $310_1$ and $310_2$. FIG. 5 is a plot of one of the resultant transmission coefficients, which represents a passband region with two distinct maxima separated by a minimum. The transmission coefficient is illustrated in decibel units and is plotted as a function of the normalized wavelength.

If an optical signal with an amplitude of $A_{I1}$ is applied to one of the input waveguides of 2×2 coupler 312 of FIG. 3 and an optical signal with an amplitude of $A_{I2}$ is applied to the other input waveguides, then the amplitudes of the output signals in waveguides $314_1$, and $314_2$, $A_{O1}$ and $A_{O2}$, respectively, are described by the following relationships:

$$\begin{bmatrix} A_{O1} \\ A_{O2} \end{bmatrix} = \begin{bmatrix} \cos\theta & j\sin\theta \\ j\sin\theta & \cos\theta \end{bmatrix} \begin{bmatrix} A_{I1} \\ A_{I2} \end{bmatrix}$$

$$\theta = \pi/4$$

where j is the imaginary number $\sqrt{-1}$.

In operation, a multiwavelength-input signal (hereinafter input signal) is directed through the input waveguide 302 of the waveguide grating router of FIG. 3 where the input signal is a multiplexed signal with wavelengths, $\lambda_1, \lambda_2, \ldots \lambda_n$. The input signal is demultiplexed into component wavelengths with each of the component wavelengths directed to a predetermined one of the output waveguides $310_k$. Specifically, the input signal is transmitted through the first free space region 304 to the optical grating 306. Due to differing lengths and curvatures of each waveguide that are separated by a fixed amount within the optical grating 306, the optical grating 306 phase-shifts each signal transmitted through each waveguide. Ultimately, the multiwavelength signal is directed through the waveguide grating router and separates into a number of output signals, with each output signal exhibiting approximately a gaussian shaped passband.

Respective adjacent output waveguides (e.g., output waveguides $310_1$ and $310_2$) are coupled together in 2×2 coupler 312 with substantially a 90° phase difference existing therebetween. The result is two signals exiting from the 2×2 coupler's output ports $314_1$, and $314_2$, which are substantially identical in magnitude, but differing in phase, flat passband spectral responses, as shown in FIG. 5.

Typically, there is a 3 dB excess loss in flat passband waveguide grating routers (such as the Y-branch arrangement) as compared to gaussian passband waveguide grating routers. The excess loss corresponds to "lost" light being uncoupled and scattered in the Y-branch coupler. Although the duplicated-port waveguide grating router, according to the principals of the present invention, has the same excess loss characteristics from input to output as the Y-branch arrangement, the light is not uncoupled and scattered, but instead is directed within one of the 2×2 coupler output ports. Thus, there is no excess loss in the duplicated-port waveguide grating router since the portion of light otherwise lost in prior art arrangements is captured in the duplicated output ports.

In contrast with the prior art, the present invention shows that it is possible to provide a duplicated-port waveguide grating router with a substantially flat passband, with significantly reduced or no loss penalties added from external couplers. The present invention, by virtue of coupling adjacent output waveguides, with a 90° phase difference, achieves the duplicated output ports with substantially identical, flat passbands.

The exemplary embodiment described above is but one of a number of alternative embodiments of the invention that will be apparent to those skilled in the art in view of the foregoing description. Accordingly, this description is to be construed as illustrative only and is for the purpose of teaching those skilled in the art the best mode of carrying out the invention. Various other alternatives can be devised by one skilled in the art without departing from the teachings of this invention.

We claim:

1. A waveguide grating router comprising:

at least one input waveguide;

a first free space region connected to the at least one input waveguide;

an optical grating connected to the first free space region, the optical grating including a plurality of unequal length waveguides;

a second free space region connected to the optical grating;

a plurality of output waveguides connected to the second free space region wherein the plurality of output waveguides includes at least two adjacent waveguides located a predetermined distance apart having ends remote from the second free space region; and CHARACTERIZED IN THAT the waveguide grating router includes a 2×2 coupler having two input ports and two output ports, the two input ports connected to the remote ends of the two adjacent waveguides respectively, the 2×2 coupler coupling the two adjacent waveguides such that substantially identical specifiable passband widths are produced within the two output ports.

2. The waveguide grating router of claim 1, wherein the 2×2 coupler realizes a substantially 90° phase difference between optical signals propagated within the two adjacent output waveguides that are coupled.

3. The waveguide grating router of claim 2, wherein the 2×2 coupler is an evanescent coupler.

4. The waveguide grating router of claim 2, wherein the 2×2 coupler is a multimode interference coupler.

5. The waveguide grating router of claim 2, wherein the 2×2 coupler is a star coupler.

6. The waveguide grating router of claim 1, wherein the plurality of output waveguides further includes at least two additional adjacent waveguides having ends remote from the second free space region and a second 2×2 coupler coupled to the ends of the adjacent waveguides.

7. A waveguide grating router with a first and second free space region, an optical grating interposed between the first and second free space region, the grating including a plurality of unequal length waveguides, the waveguide grating router comprising:

at least one waveguide connected to the first free space region, the at least one waveguide for receiving at least one optical signal;

a plurality of waveguides connected to the second free space region, the plurality of waveguides for transmitting a plurality of output signals;

wherein the plurality of waveguides includes at least two adjacent waveguides having ends remote from the second free space region, wherein the adjacent waveguides are located a predetermined distance apart along the second free space region; and a 2×2 coupler having two input ports connected to the remote ends of the two adjacent waveguides and two output ports, wherein the 2×2 coupler realizes a substantially 90° phase difference between optical signals propagated within the two adjacent output waveguides that are coupled to produce substantially identical specifiable passband widths within the two output ports.

8. A waveguide grating router comprising:

at least one input waveguide;

a first free space region connected to the at least one input waveguide;

an optical grating connected to the first free space region, the optical grating including a plurality of unequal length waveguides;

a second free space region connected to the optical grating;

a plurality of output waveguides connected to the second free space region wherein the plurality of output waveguides includes at least two adjacent waveguides located a predetermined distance apart from the second free space region; and a 2×2 coupler having two input ports and two output ports, the two input ports connected to the second free space region a predetermined distance apart, the 2×2 coupler for coupling signals in the two input ports such that substantially identical specifiable passband widths are produced within the two output ports.

* * * * *